United States Patent [19]

Bardoorian

[11] Patent Number: 4,836,632

[45] Date of Patent: Jun. 6, 1989

[54] FIBER OPTIC LIQUID LEVEL SENSOR

[75] Inventor: Robert J. Bardoorian, New Britain, Conn.

[73] Assignee: National Magnetic Sensors Inc., Plantsville, Conn.

[21] Appl. No.: 194,397

[22] Filed: May 16, 1988

[51] Int. Cl.⁴ ............................ G02B 6/36; G02B 7/26
[52] U.S. Cl. .................................................... 350/96.20
[58] Field of Search ............... 350/96.20, 96.21, 96.24, 350/96.10

[56] References Cited

U.S. PATENT DOCUMENTS

| | | | |
|---|---|---|---|
| 4,038,650 | 7/1977 | Evans et al. | 350/96.20 |
| 4,201,086 | 5/1980 | Jones | 350/96.20 |
| 4,261,638 | 4/1981 | Wagner | 350/96.20 |
| 4,379,289 | 4/1983 | Peek | 350/96.20 |
| 4,398,789 | 8/1983 | Pryor | 350/96.20 |
| 4,410,020 | 10/1983 | Lorenz | 350/96.20 |

Primary Examiner—William L. Sikes
Assistant Examiner—Robert E. Wise
Attorney, Agent, or Firm—John H. Crozier

[57] ABSTRACT

A fiber optic liquid level sensor having a vertical tube which may be placed in a vessel containing the liquid to be sensed. Disposed for free movement along the exterior of the tube is an annular float equipped with a magnet. A fiber optic cable containing two optical fibers is attached to the top of the tube and the optical fibers extend to a selected point where it is desired to sense the liquid level. There the fibers terminate facing a movable mirror to which a magnet is attached. With a rising liquid level, the mirror is carried upward by the magnetic linkage of the magnet on the float and the magnet to which the mirror is attached. When the mirror reaches the focal point of the optical fibers, the light circuit is closed and an electrical signal derived therefrom may be used to open or close a switch. When the liquid level falls so that the mirror drops below the focal point of the optical fibers, the light circuit will be opened. The optical fibers are completely isolated from the environment of the liquid and, thus, the sensor may be used in hazardous locations.

6 Claims, 1 Drawing Sheet

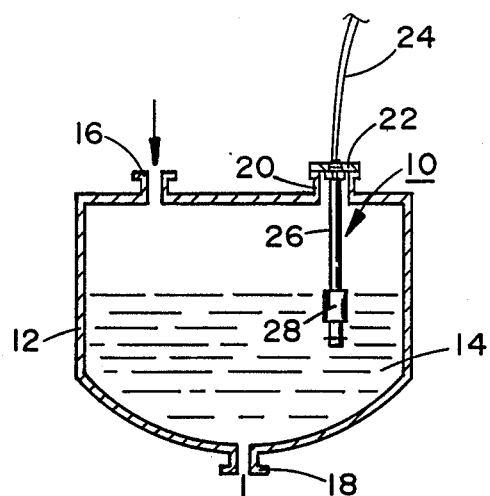
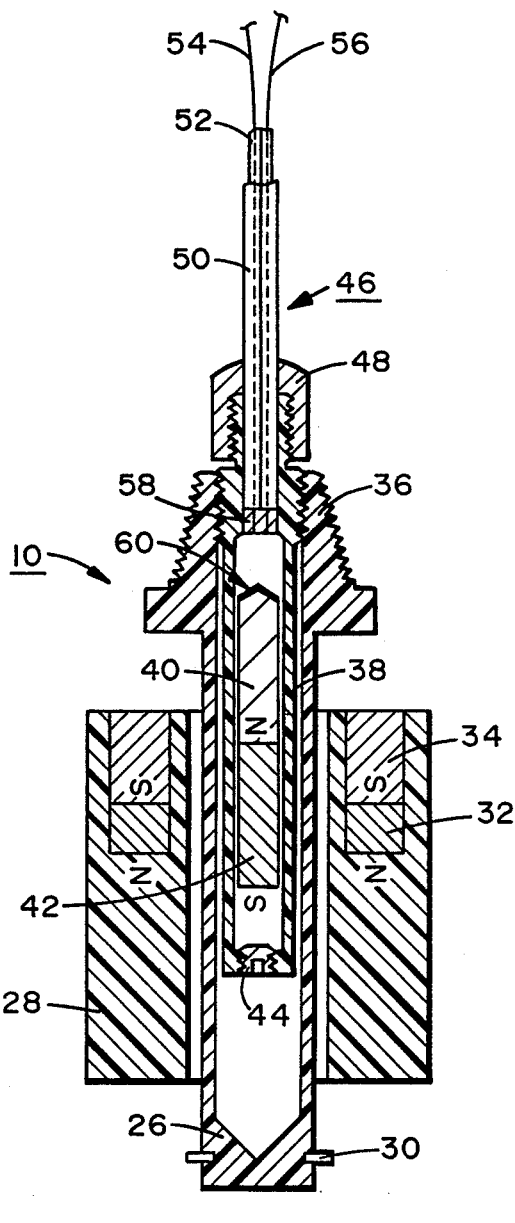
FIG. 1
FIG. 3
FIG. 2

FIBER OPTIC LIQUID LEVEL SENSOR

BACKGROUND OF THE INVENTION

1. Field of the Invention.

The present invention relates to liquid level sensors generally and, more particularly, to a novel liquid level sensor that employs a movable magnet with a mirror thereon to make or break a fiber optic light beam.

2. Background Art.

Liquid level sensors are well known devices for detecting the level of any of a number of liquids and include ball-float mechanisms, magnetic-type float gages, torque-tube and force-balance mechanisms, diaphragm-box systems, and manometers, any of which may be used for gaging and/or switching. For example, such a device could be used to measure the level of a liquid in a vessel and shut off a pump when the level reaches a selected value, or it may be used in conjunction with a high- or low-level alarm, or in any other of many known applications for such devices.

All of these conventional systems have the disadvantage of having a critical element in contact with the liquid. This may result in accumulation of foreign matter which interferes with the sensitivity of the element and/or chemical or physical attack by the liquid may also lead to inaccuracies or malfunctions. Some of these devices are relatively complicated and may have linkages, gaskets, and/or bellows which may fail in operation. Many require frequent adjustment or recalibration when in use.

A fairly recent development is a float-type sensor which comprises an annular float freely movable on the exterior of a vertical, hollow tube in response to changes in the level of a liquid in which the tube is positioned. Such sensors are manufactured, for example, by National Magnetic Sensors, Plainville, Connecticut. The float is equipped with a magnet which opens or closes a magnetic reed switch when the level reaches a selected point. Being isolated within the tube, the reed switch cannot be contaminated by enviromental dust, dirt, oil, and humidity. The tube and the float are the only elements of the device which contact the liquid being measured and these may be constructed of virtually any material compatible with the liquid. While these sensors are extremely reliable and the reed switches are rated at up to 100 million cycles, they inherently require that electric leads, albeit at a low electrical potential, must extend to the reed switch. In some cases, this feature means that that type of sensor cannot be used in potentially explosive or flammable environments.

One potential technique for liquid level sensing involves the use of fiber optics, a major advantage thereof being that any electrical elements in the system can be isolated from any hazardous location. Heretofore, however, the use of fiber optics has not proven feasible because attempts to place optical fibers in a vessel and sense the reflection of light from the surface of the liquid have generally been unsuccessful because of fouling of the ends of the optiical fibers.

Accordingly, it is a principal object of the present invention to provide a fiber optic liquid level sensor which isolates the optical fibers from the liquid being sensed.

Another object of the invention is to provide such a sensor that requires no eletrical elements be located in or near the sensor.

An additional object of the invention is to provide such a sensor that may be constructed of any material compatible with the liquid being sensed.

A further object of the invention is to provide such a sensor that may have multiple sense points.

Yet another object of the invention is to provide such a sensor that is rugged and not susceptible to fouling of the critical elements.

Yet an additional object of the invention is to provide such a sensor that is economical to construct and requires no periodic adjustment or recalibration.

Other objects of the invention, as well as particular features and advantages thereof, will, in part, be obvious and will, in part, be apparent from the following description and the accompanying drawing figures.

SUMMARY OF THE INVENTION

The present invention accomplishes the above objects, among others, by providing, in a preferred embodiment, a fiber optic liquid level sensor having a vertical tube which may be placed in a vessel containing the liquid to be sensed. Disposed for free movement along the exterior of the tube is an annular float equipped with a magnet. A fiber optic cable containing two optical fibers is attached to the top of the tube and the optical fibers extend to a selected point where it is desired to sense the liquid level. There the fibers terminate facing a movable mirror to which a magnet is attached. With a rising liquid level, the mirror is carried upward by the magnetic linkage of the magnet on the float and the magnet to which the mirror is attached. When the mirror reaches the focal point of the optical fibers, the light circuit is closed and an electrical signal derived therefrom may be used to open or close a switch. When the liquid level falls so that the mirror drops below the focal point of the optical fibers, the light circuit will be opened. The optical fibers are completely isolated from the environment of the liquid and, thus, the sensor may be used in hazardous locations.

BRIEF DESCRIPTION OF THE DRAWING

FIG. 1 is a side elevation view, partially in cross-section, of the liquid level sensor of the present invention mounted in a vessel containing a liquid.

FIG. 2 is a side elevation view, in cross-section, of an embodiment of the present invention.

FIG. 3 is a side elevation view, in cross-section, of an embodiment of the present invention suitable for use in multi-level sensing.

DETAILED DESCRIPTION OF THE PREFERRED EMBODIMENTS

Referring now to the Drawing, FIG. 1 shows the sensor of the present invention, generally indicated by the reference numeral 10, mounted in a vessel 12 which contains a liquid 14, while FIGS. 2 and 3 show alternative embodiments of the invention. Identifying numerals are consistent throughout the various drawing figures.

Vessel 12 is shown as having nozzles 16 and 18 for the inlet and outlet of liquid 14 and sensor 10 may be mounted to a nozzle 20 by being threaded into a flange plate 22. Sensor 10 is connected to remote control means (not shown) by cable 24 so that, for example, inlet and the outlet of the liquid may be controlled be sensor 10 sensing the level of the liquid.

Sensor 10 includes a hollow, liquid-tight tube, or stem, 26 around which disposed for free movement therewith is an annular float 28 which is prevented from falling off stem 26 by means of retaining ring 30. Annular float has mounted therein a first magnet 32 held in place by an embedding material 34 which may be an epoxy material. At the upper end of stem 26 is a threaded connector 36 for attachment to flange plate 22. Attached to threaded connector 36 and coaxially disposed within stem 26 is a mirror cartridge 38 having disposed therein for relatively close-fitting axial movement therewith a mirror 40 to which is fixedly attached a second magnet 42. Second magnet 42 is axially magnetized oppositely from the magnetization of first magnet 32, as indicated by the "N" and "S" notations, so that the two magnets may be flux-linked. A retaining screw 44 disposed in the lower end of mirror cartridge 38 prevents mirror 40 and attached second magnet 42 from falling from the mirror cartridge.

Attached to the upper end of mirror cartridge 38 is a fiiber optic "duplex into single connector" cable assembly, generally indicated by the reference numeral 46, such as manufactured, for example, by Ensign-Bickford Industries. Cable assembly 46 includes a threaded connector 48 for attachment to the upper end of mirror cartridge 38 and has an outer sheath 50 covering a polymeric material 52 in which are embedded two optical fibers 54 and 56, one of which is connected to a light source, visible or otherwise, and the other of which is connected to a light detector. Optical fibers 54 and 56 terminate in a downward facing position in end piece 58 which comprises part of cable assembly 46. The spacing apart of the terminations of optical fibers 54 and 56 is exaggerated on FIG. 2 for clarity. The upper end of mirror 40 preferably terminates in an inverted cone 60 having its apex generally aligned with the terminating ends of optical fibers 54 and 56.

To describe the operation of sensor 10, it may be assumed that sensor 10 has been mounted in vessel 12 which is empty and, therefore, annular float 28 would be resting on retaining ring 30 and second magnet 42 would be resting against the bottom of mirror cartridge 38. Liquid 14 is added to vessel 12 through nozzle 16 and eventually the surface reaches annular float 28 which begins to rise. At some point, first and second magnets 32 and 42 become fluxlinked and the second magnet and, thus, mirror 40 are drawn upward. When mirror 40 reaches a predetermined selected point, light from one of optical fibers 54 and 56 will be reflected from the apex of inverted cone 60 to the other of the opticial fibers, thus closing the light circuit. Control means (not shown) to which cable assembly 46 is attached may then terminate the filling of vessel 12. When the level of liquid 14 drops, the optical circuit will be opened and that event may be used for other control purposes, such as adding liquid to the vessel.

While stem 26 of sensor 10 is shown on FIGS. 1 and 2 as being vertically disposed, it may be mounted and operated satisfactorily at angles up to about 30 degrees from the vertical. Also, sensor 10 can be mounted in an inverted position (not shown) so that a rising liquid level will break a light circuit.

Two or more mirror cartridges according to the present invention may be mounted in stem 26 in order to provide multi-level sensing; however, mirror cartridge 38 is not entirely satisfactory for such application because connector 48 of each cable assembly 46 requires too much room within the stem. Accordingly, an alternative embodiment of mirror cartridge is shown on FIG. 3 where elements similar to those on FIG. 2 are given primed reference numerals. Here, optical fibers 54' and 56' are led through and bonded to close-fitting holes in an elongated end cap 58' and terminate in a downward facing position at the lower end thereof. With the configuration of mirror cartridge 38', it has been found that it is preferable to have the end 60' of mirror 40' formed flat or even concave rather than coneshaped. Mirror cartridges 38' would be fixed at selected intervals along stem 26, with optical fibers 54' and 56' led out the top of the stem where ample room can be provided for connection to fiber optic cable assemblies. The possible length of the sensor and the number of mirror cartridges 38' therein are virtually unlimited.

As noted above, cable assembly 46 is commercially available. Mirrors 40 and 40' are preferably formed of aluminum. First magnet 32 is preferably a ceramic ring magnet and second magnet 42 is preferably Alnico V. While there are preferably provided two magnets, as described, for greatest sensitivity of sensor 10, one or the other could be replaced with a non-magnet material which would be attracted to the remaining magnet. Annular float 28 may be constructed of any material known to be compatible with the liquids to be contacted and for many liquids, Buna N has been found to be satisfactory. For some applications, annular float 28 may be a hollow stainless steel and, in severe environments, all wetted parts may be made of glass. Other elements of sensor 10 may be constructed of any suitable materials known in the art.

It will thus be seen that the objects set forth above, among those made apparent from the preseding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A liquid level sensor, comprising:
   (a) tube means;
   (b) connector means at one end of said tube means, said connector means adapted to connect to said tube means first and second optical fibers terminating in said tube means, said first optical fiber being connected to a source of light and said second optical fiber being connected to a light detector;
   (c) mirror means movable within said tube means such that, at a selected point of movement of said mirror means, said mirror means will reflect light from said first optical fiber to said second optical fiber; and
   (d) means responsive to changes in said liquid level to effect movement of said mirror means.

2. A liquid level sensor, as defined in claim 1, further comprising:
   (a) said means responsive to changes in said liquid level comprises float means movable along the exterior of said tube means; and (b) a first magnet fixed to said float means and flux-linked to said mirror means.

3. A liquid level sensor, as defined in claim 1, further comprising:
(a) said means responsive to changes in said liquid level comprises float means movable along the exterior of said tube means; and
(b) a second magnet fixed to said mirror means and flux-linked to said float means.

4. A liquid level sensor, as defined in claim 1, further comprising:
(a) said means responsive to changes in said liquid level comprises float means movable along the exterior or said tube means;
(b) a first magnet fixed to said float means; and
(c) a second magnet fixed to said mirror means and flux-linked to said first magnet.

5. A liquid sensor, as defined in claim 1, wherein said tube means comprises:
(a) a hollow stem;
(b) a hollow mirror cartridge disposed within and attached to a first end of said stem; and
(c) said mirror means moves within said mirror cartridge.

6. A liquid level sensor, as defined in claim 5, wherein:
(a) said mirror cartridge is adapted for connection thereto of said first and second optical fibers; and
(b) said optical fibers terminate within said mirror cartridge facing said mirror means.

* * * * *